United States Patent [19]
Ueda

[11] 3,862,514
[45] Jan. 28, 1975

[54] RADIO CONTROLLED TOY AUTOMOBILE
[75] Inventor: Minoru Ueda, Kyoto, Japan
[73] Assignee: Nintendo Co., Ltd., Kyoto, Japan
[22] Filed: Mar. 13, 1973
[21] Appl. No.: 340,900

[30] Foreign Application Priority Data
Mar. 14, 1972   Japan............................ 47-025974

[52] U.S. Cl. ................................. 46/244 B, 46/210
[51] Int. Cl. ............................................ A63h 17/36
[58] Field of Search ...... 46/210, 244 A, 244 B, 206, 46/211, 213

[56] References Cited
UNITED STATES PATENTS
2,923,092   2/1960   Reiser ................................. 46/210
3,029,371   4/1962   Saito ................................. 46/244 B

*Primary Examiner*—Louis G. Mancene
*Assistant Examiner*—Robert F. Cutting
*Attorney, Agent, or Firm*—Hans Berman

[57]          ABSTRACT

The front steering axle of a radio controlled toy automobile carries an idler wheel and also a fixed, motor-driven wheel. When the driving force stops, the body of the toy automobile continues moving and the driving wheel moves rearward relative to the body so that the toy automobile turns.

4 Claims, 5 Drawing Figures

RADIO CONTROLLED TOY AUTOMOBILE

BACKGROUND OF THE INVENTION

This invention relates to a radio controlled toy automobile and, more particularly, to a toy automobile whose running control is simple and which is suitable for high speed driving.

SUMMARY OF THE INVENTION

The toy vehicle of the invention has front and rear axles mounted on the vehicle body. An idler wheel and a driven wheel are coaxially mounted in axially spaced relationship on one of the axles while the other axle carries an idler wheel. A pivot interposed between the one axle and the vehicle body permits movement of the one axle about a pviot axis transverse to the common axis of the wheels on the one axle. The driven wheel may be rotated about the common axis relative to the coaxial idler wheel. Abutments limit movement of the one axle about its pivot axis. Controls permit the drive for the driven wheel to be energized and deenergized.

DESCRIPTION OF THE PREFERRED EMBODIMENT

Figure 1:
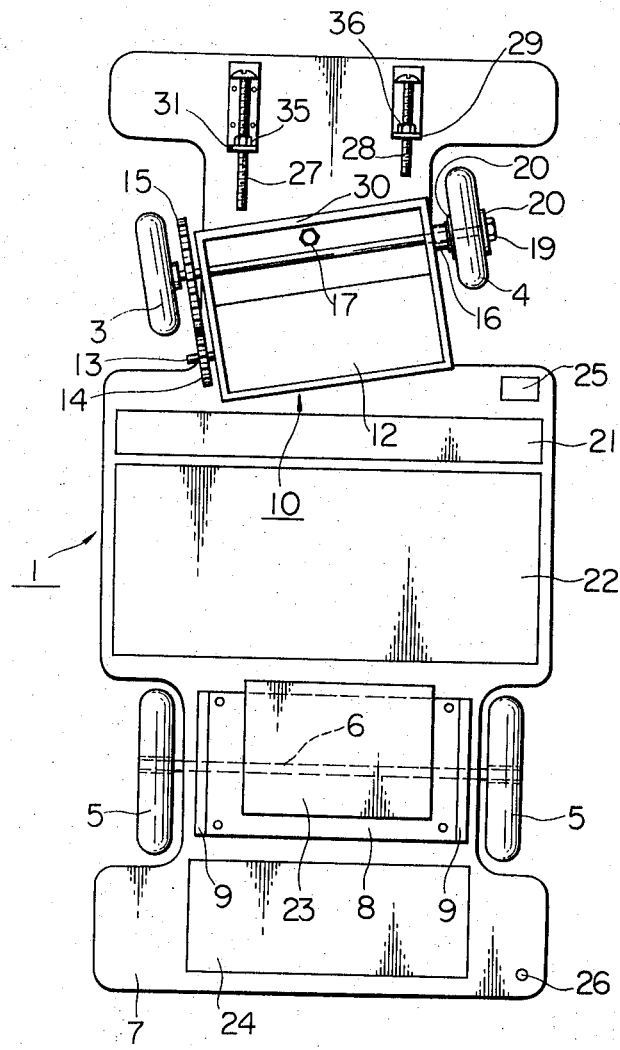
FIG. 1 is a bottom view of a radio controlled toy automobile of this invention.
Figure 2:
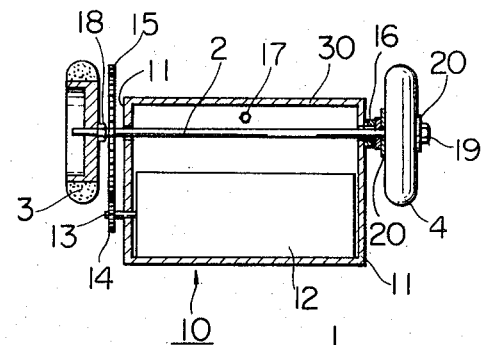
FIG. 2 is a partially sectional bottom view of the driving mechanism of the toy automobile shown in FIG. 1.
Figure 3:
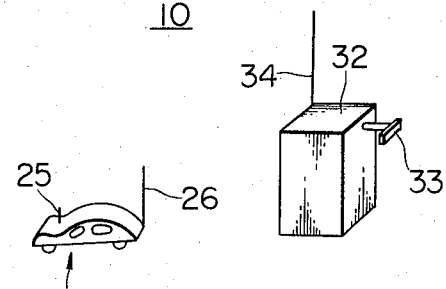
FIG. 3 shows a control system for the automobile of the invention.

The illustrated toy automobile 1 has a front axle 2 carrying a fixedly mounted, right, driven wheel 3 and a coaxial, left idler wheel 4 which is free to rotate on the axle 2. Two rear idler wheels 5 are fastened to a rear axle 6 journaled in brackets 9 of a frame 8 on the underside of the automobile body 7. The four wheels define a common plane tangential to each wheel and horizontal in the normal operating position of the toy automobile.

The front axle 2 is journaled in side plates 11 of a supporting frame 10 which also carries an electric motor 12. A gear 14 on the output shaft 13 of the motor meshes with a gear 15 on the axle 2. The frame 10 is attached to the body 7 by a pivot pin 17. The driven wheel 3 is fastened to the axle 2 by a nut 18. A nut 19, a collar 16 on the shaft 2, and two washers 20 axially secure the idler wheel 4.

The body 7 also carries a motor control unit 21, an energy source 22 for the motor 12, a radio receiver 23 for remote control signals, a source 24 of electric current for the receiver 23, a motor switch 25 in the shape of a radio antenna, and an antenna 26 for receiving control signals.

Two abutments 27, 28 are threadedly mounted on brackets 31, 29 which depend from the body 7 ahead of the frame 10. The abutments limit angular movement of the frame 10 about the normally upright pivot axis of the pin 17 by engagement with the front plate 30 of the frame. The abutments 27, 28 may be adjusted threadedly on the associated brackets in the direction of normal travel of the toy automobile and secured in the adjusted position by nuts 35, 36.

When a push button 33 of a transmitter 32 is pressed, a control signal is transmitted from the antenna 34 of the transmitter to the antenna 26. When the motor switch 25 is on, the receiver 23 amplifies the control signal and transmits the amplified signal to the motor control unit 21 which energizes the motor 12.

Figure 4:
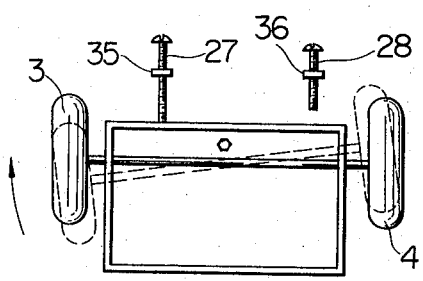
FIG. 4 shows the driving mechanism of FIG. 2 in a first position for straight forward movement.
Figure 5:
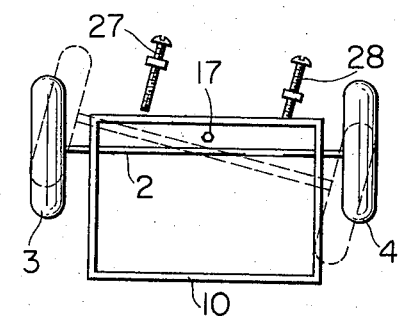
FIG. 5 shows the driving mechanism in a second position for left turning.

The wheel 3 is driven and pivots the frame 10 on the body 7 clockwise, as viewed in FIG. 4, until the front late 30 engages the abutment 27 in a position of the frame 10 and the axle 2 in which the automobile is driven straight forward by the wheel 3.

When the push button 33 is released, motor 12 is deenergized. The body 7 continues moving due to inertia, but the wheel 3 drags behind, thereby pivoting the frame 10 on the pin 17 until the front plate 30 strikes the abutment 18. The toy automobile makes a turn whose radius of curvature is determined by the position of the abutment 27.

The length of the arcuate movement of the automobile can be controlled by intermittent radio signals. Turns, including U-turns, may be made at high speed.

If a resistor is arranged in series with the motor 12 when the latter is deenergized, the motor acts as a dynamic brake on the wheel 3 to permit very sharp turns.

What is claimed is:

1. A toy vehicle comprising:
   a. a body;
   b. a front axle and a rear axle mounted on said body;
   c. an idler wheel and a driven wheel coaxially mounted in axially spaced relationship on one of said axles;
   d. an idler wheel on the other axle;
   e. pivot means operatively interposed between said one axle and said body permitting movement of said one axle about a pivot axis transverse to the common axis of said idler wheel and of said driven wheel on said one axle;
   f. drive means for rotating said driven wheel about said common axis relative to said coaxial idler wheel;
   g. abutment means for limiting movement of said one axle about said pivot axis; and
   h. control means for energizing and deenergizing said drive means.

2. A vehicle as set forth in claim 1, wherein said pivot means include a support mounted on said body for movement about said pivot axis, said one axle being journaled in said support for rotation about said common axis, one of said coaxially mounted wheels being fixedly fastened to said one axle, the other coaxially mounted wheel being free to rotate on said one axle.

3. A vehicle as set forth in claim 2, wherein said drive means include an electric motor mounted on said support, said abutment means engaging said support for limiting movement of said one axle about said pivot axis.

4. A vehicle as set forth in claim 1, wherein said one axle is said front axle.

* * * * *